Nov. 17, 1942.    T. E. BOSWORTH    2,302,100
METHOD OF FORMING A SPECTACLE TEMPLE
Filed Oct. 17, 1941
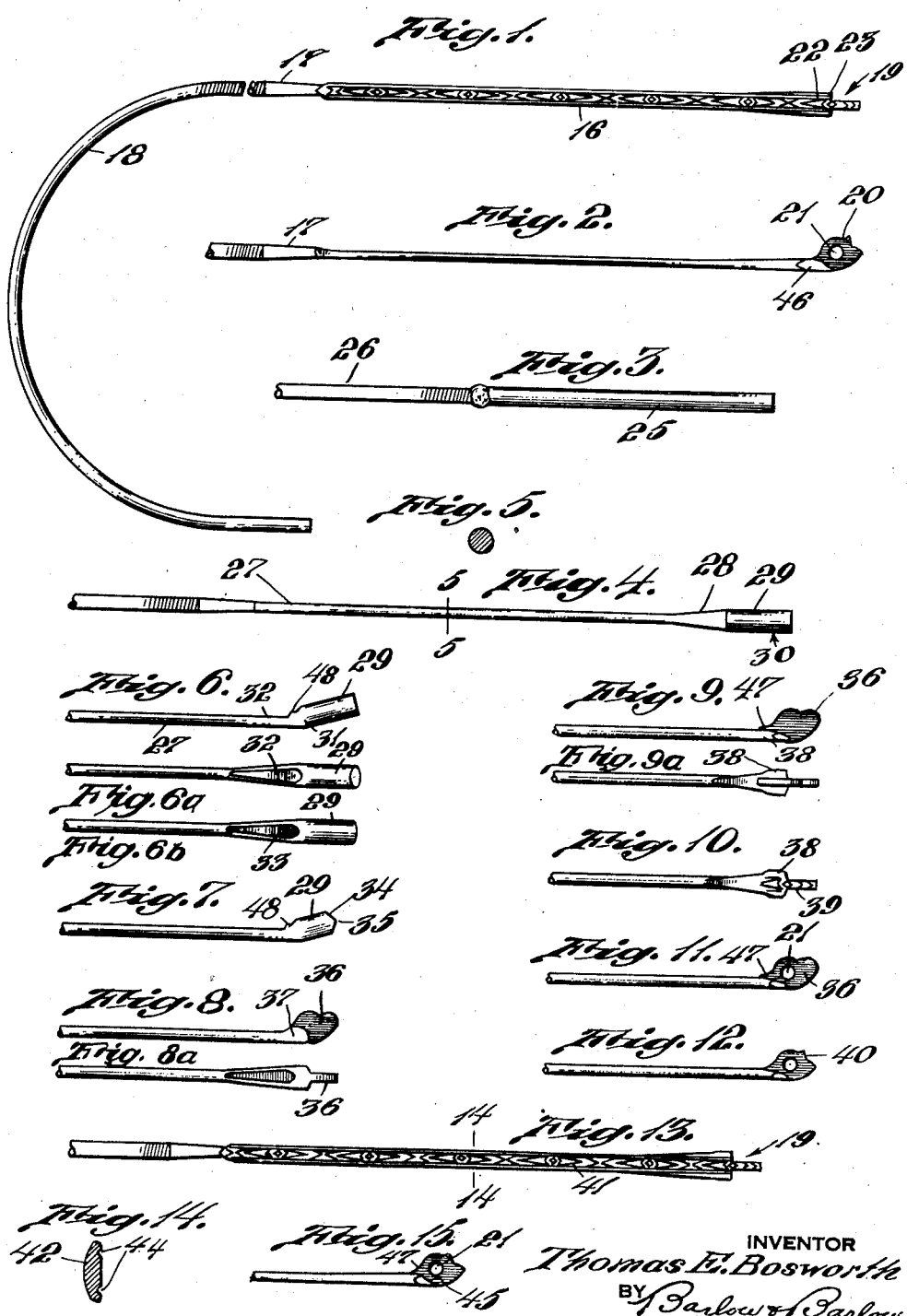
INVENTOR
Thomas E. Bosworth
BY Barlow & Barlow
ATTORNEYS Patented Nov. 17, 1942

2,302,100

UNITED STATES PATENT OFFICE 2,302,100

METHOD OF FORMING SPECTACLE TEMPLES

Thomas Edward Bosworth, Cranston, R. I., assignor to Universal Optical Company, Inc., a corporation of Rhode Island Application October 17, 1941, Serial No. 415,421

4 Claims. (Cl. 29—20)

This invention relates to the method of forming a spectacle temple such as shown in my copending application Serial No. 315,393 (now Patent 2,290,161, issued July 21, 1942) which is directed to the finished product and is a continuation in part of said application.

In the formation of spectacle temples heretofore it has been usual to provide a hinge joint of the temple generally in line with the extent of the temple and by such arrangement a line of demarcation occurred at the end of the temple between its end and the end piece with which it is hingedly joined by reason of the joint. The location of the hinge tongue makes difficult an arrangement of wire stock so as to provide the width of the tongue and desired vertical dimension of the temple to an extent to equal the similar dimension of the end piece at the joint.

One of the objects of this invention is to so thin the stock laterally of the temple at its end or edge that it will merge with the end piece so that no distinct line of demarcation between the two will be apparent.

Another object of this invention is to so manipulate the stock of the temple in forming the same that a sufficient amount of stock will be provided at the end of the temple so as to provide a tongue joint in offset relation and yet leave sufficient stock so that the width of the temple will be the same as the width of the end piece at the joint.

Another object of this invention is to manipulate this stock by a swedging operation.

Another object of the invention is to provide a temple which may be assembled with a standard end piece having a single slot for the temple tongue.

With these and other objects in view, the invention consists of certain novel features of construction, as will be more fully described, and particularly pointed out in the appended claims.

In the accompanying drawing:

Fig. 1 is a side elevation of the temple broken to shorten its length.

Fig. 2 is a fragmental top plan view of the temple shown in Fig. 1.

Fig. 3 is a fragmentary elevational view illustrating the first step in the formation of the temple.

Fig. 4 is an elevation illustrating the second step.

Fig. 5 is a section on line 5—5 of Fig. 4.

Fig. 6 is a fragmental top plan view illustrating the third step and Fig. 6a and Fig. 6b are opposite side views of the results of the third step in the operation.

Fig. 7 is a top plan view illustrating the fourth step.

Fig. 8 shows a top plan view and Fig. 8a a side view as a result of the performing of the fifth step.

Fig. 9 is a top plan view and Fig. 9a a side view after the sixth step has been performed.

Fig. 10 is a side view showing the result of the seventh step.

Fig. 11 is a top plan view after the eighth step has been performed.

Fig. 12 is a top plan view after the performance of the ninth step.

Fig. 13 is a side elevation view and shows the temple after the performance of the tenth step.

Fig. 14 is a section on line 14—14 in Fig. 13.

Fig. 15 is a top plan fragmental view after the eleventh step has been performed.

The finished temple assembled with a standard end piece is shown in my co-pending application Serial No. 315,393 above referred to in which the temple in combination with its end piece is claimed in article form. In the finished temple the shank consists of ornamented wire 16 with an extending portion 17 and an ear-engaging portion 18. The forward end 19 of the ornamented shank is the subject of this invention and is manipulated so as to provide a single leaf or tongue 20 having an opening 21 therein to receive the hinge pivot when assembled with the end piece such as illustrated in the above referred to application. This tongue 20 is located wholly to the inside of the longitudinal extent of the temple as shown in Fig. 2 while the temple is expanded vertically as at 22 to provide flanges on either side of this tongue 20, which flanges are thinned at their forward edge 23, and it is this peculiar formation of the stock at this end which is difficult to provide from wire stock.

In the formation of this temple, the round wire 25 is soldered to the tubular helically cut wire 26 fashioned in this manner for greater flexibility. The wire 25 is then swedged to provide a round portion 27 of smaller diameter tapered as at 28 at either end of this portion of smaller diameter with the end portion 29 left or remaining the size of the original wire 25. The end portion designated generally 30 and consisting of tapered portion 28 and original size wire 29 is then bent as illustrated at 31 in Fig. 6 and at the same time the sides of the stock are flattened as at 32 with a projection 48 on the inside of the bend and at 33 on the outside of the bend. In this manner the end portion 30 of the stock is offset inwardly from the generally longitudinal extent of the wire 27.

The next step in the operation is the trimming of the end portion 29 as at 34 so as to provide a point 35. This trimmed end portion is then struck to provide a flattened leaf or tongue 36 (see Fig. 8) which by reason of the point assumes the shape of the stock with the periphery as illustrated in the plan view of Fig. 8. This tongue 36 will be symmetrically disposed vertically of the stock as shown in side view of Fig. 8.

The stock is then struck to spread it in a direction at right angles to its direction of spread in Fig. 8 so as to spread the end portion 37 into the formation shown in Fig. 9 which provides flanges 38 at either side of the tongue 36 while leaving the tongue substantially as previously formed. A second striking similar to the striking just had is then performed as at Fig. 10 in which the stock is further spread and some ornamentation 39 is placed upon the outer surface of the temple.

The next operation is that of piercing the hole 21 in the tongue 36 and thereafter there is a trimming operation as at 40 for the end of tongue 36. The shape of the end 40 provides a stop on the tongue for engagement with an abutment surface on the end piece of the joint to limit the swinging movement of the temple. A further operation is that of striking and ornamenting the wire 16 to provide ornamentation 41 thereon and shape the piece in the cross sectional form as shown in Fig. 14 wherein the inner surface is convexly arcuate as at 42 while the outer surface is flattened as at 43 with the groove 44 of ornamentation therein. The next operation is that of milling the surface 45 as shown in Fig. 15 so as to form the same concentric with the hole 21 and thereafter a further shaping of the edge of the temple is had by a slight compression at the edge forming a flattened surface 46 adjacent the thinned edge of the temple and bringing the width to the size of the end piece into which it is to fit.

The small fillet 47 is formed at the juncture of the tongue with the shank such as illustrated in Figs. 9 and 11 and which is formed by the point 48 of the stock in the formation of the flat surface 32 as shown in Fig. 6 and which serves to strengthen the connection of the tongue with the shank at the inner edge thereof.

From the foregoing it will appear that I have offset the tongue 36 of the temple from the direction of longitudinal extent of the temple, thus providing this tongue completely inside of the general longitudinal extend of the temple and enabling the shank of the temple and flanges 38 of the temple to merge with the outer contour of the end piece and minimize any line of demarcation especially when the temple is the width the same as the end piece and thus provide a smooth connection therewith.

I claim:

1. The method of forming a joint end for a temple which consists in swaging the end portion of said temple to deform the stock and provide a tongue partially longitudinally overlapping an unswaged part of the temple and then swaging the unswaged overlapping stock to deform it in a direction at right angles to the first deformation to provide flanges.

2. The method of forming a joint end for a temple which consists in swaging the end portion of said temple to spread the stock in one direction and provide a tongue partially longitudinally overlapping an unswaged part of the temple and then swaging the unswaged overlapping stock adjacent to, but on either side of said tongue, to spread the same in a direction at right angles to the first spreading to provide flanges for engagement with the lens member.

3. The method of forming a temple joint which consists in offsetting the stock at the end of the temple from the general direction of extent of the temple, deforming the offset stock to provide a tongue partially longitudinally overlapping an unswaged part of the temple and then swaging the unswaged overlapping stock to deform it in a direction at right angles to the first deformation to provide flanges at either side of the tongue.

4. The method of forming a temple joint end which consists in swaging the end portion of said temple to deform the stock in one direction and provide a tongue and then swaging the stock to deform it in a direction at right angles to the first deformation to provide flanges, then trimming the swaged end portion and engraving the outer surface of the temple, flanges and the edge of the tongue all in one operation.

THOMAS EDWARD BOSWORTH.